US010261980B2

(12) United States Patent
James

(10) Patent No.: US 10,261,980 B2
(45) Date of Patent: Apr. 16, 2019

(54) METHOD AND SYSTEM FOR PERSISTING ADD-IN DATA IN DOCUMENTS

(76) Inventor: Fletcher James, Leesburg, VA (US)

(*) Notice: Subject to any disclaimer, the term of this patent is extended or adjusted under 35 U.S.C. 154(b) by 1681 days.

(21) Appl. No.: 13/569,843

(22) Filed: Aug. 8, 2012

(65) Prior Publication Data

US 2014/0047317 A1    Feb. 13, 2014

(51) Int. Cl.
G06F 17/00 (2019.01)
G06F 17/22 (2006.01)
G06F 17/24 (2006.01)

(52) U.S. Cl.
CPC .......... G06F 17/2205 (2013.01); G06F 17/24 (2013.01)

(58) Field of Classification Search
CPC .............................. G06Q 10/10; G06F 16/951
USPC ......................................... 715/234, 200, 255
See application file for complete search history.

(56) References Cited

U.S. PATENT DOCUMENTS

| | | | | |
|---|---|---|---|---|
| 7,441,185 B2* | 10/2008 | Coulson et al. | | 715/234 |
| 8,370,740 B2* | 2/2013 | Zinkovsky et al. | | 715/255 |
| 8,539,336 B2* | 9/2013 | Griffiths et al. | | 715/230 |
| 2009/0235148 A1* | 9/2009 | Zinkovsky | | G06F 8/70 715/200 |
| 2010/0076946 A1* | 3/2010 | Barker | | G06F 17/24 707/705 |
| 2011/0202424 A1* | 8/2011 | Chun et al. | | 705/26.8 |
| 2015/0199317 A1* | 7/2015 | Lemonik | | G06F 17/24 715/255 |

OTHER PUBLICATIONS

Levit, Best Authority User's Guide, published 2010, pp. 1-159 (pdf).*
Microsoft® Office 2003 for Windows, see, http://office.microsoft.com/en-us/word-help/introducing-microsoft-office-word-2003-HA001071494.aspx?CTT=1 (last visited Aug. 8, 2012).
West Cite Advisor, see http://store.westlaw.com/products/services/cite-advisor/default.aspx (last visited Aug. 8, 2012).
Litéra® CitationWare®, see http://www.litera.com/citationware.aspx (last visited Aug. 8, 2012).
Lexis® for Microsoft® Office, see http://www.lexisnexis.com/newlexis/office/ (last visited Aug. 8, 2012).

* cited by examiner

Primary Examiner — Manglesh M Patel
(74) Attorney, Agent, or Firm — Matthew Levy; Clyde E. Findley

(57) ABSTRACT

A method and system for storing data used by an add-in application in, or associated with, a document. Document-based applications, such as Microsoft® Word and Corel® WordPerfect®, can be functionally enhanced with third-party add-ins. Present methods of storing data in a document body can slow down the document-based application processing significantly as the document grows large and the data associated with the add-in or document application also grows. Other current methods use auxiliary files, which means that the auxiliary files must be kept with the document. The presented method and system enable efficient add-in storage in a document, without substantial slow-down in performance or interference with the user's ability to manipulate the document. Because data is stored within the document itself, the document can be shared without losing data used by the add-in application.

18 Claims, 8 Drawing Sheets

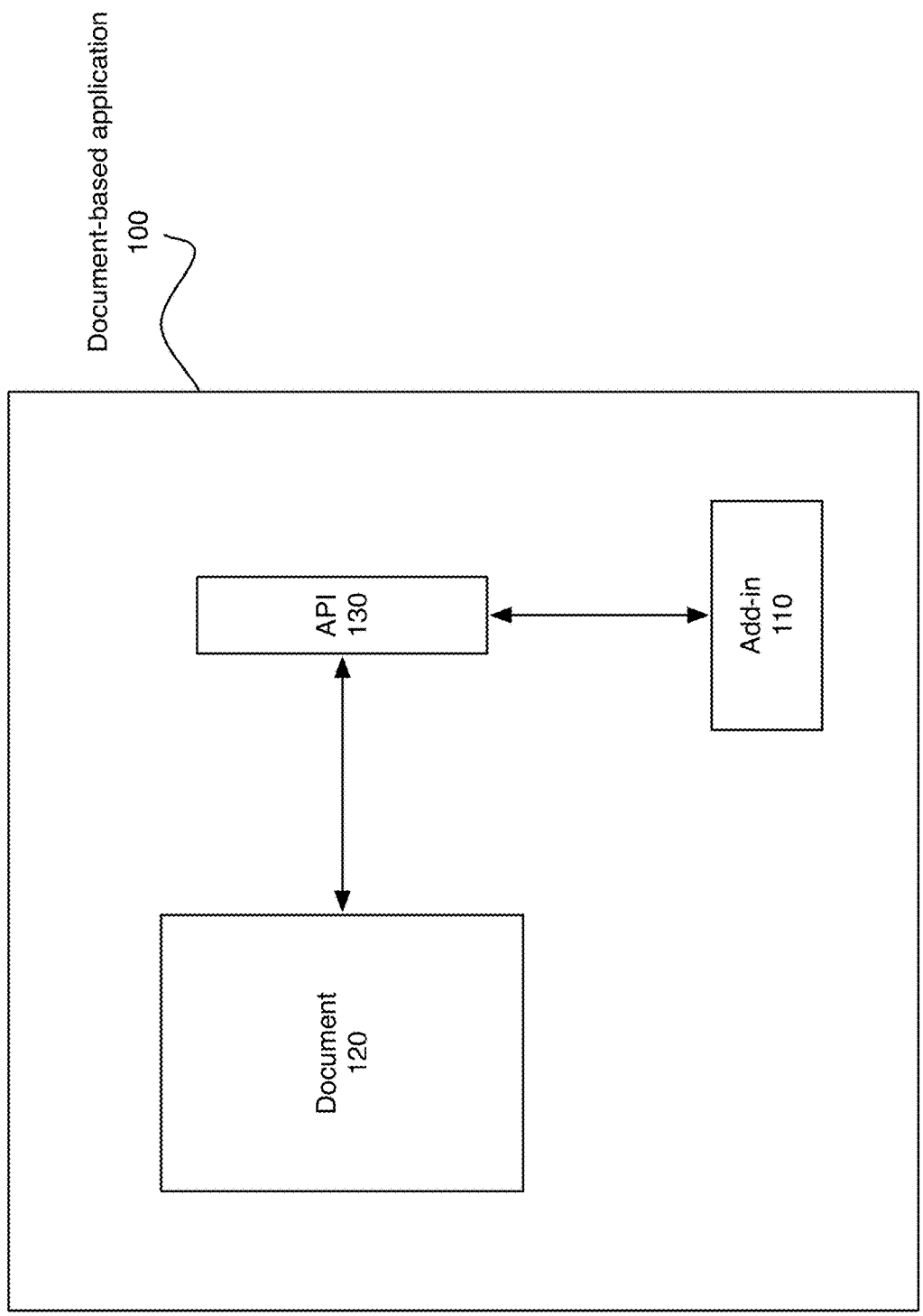

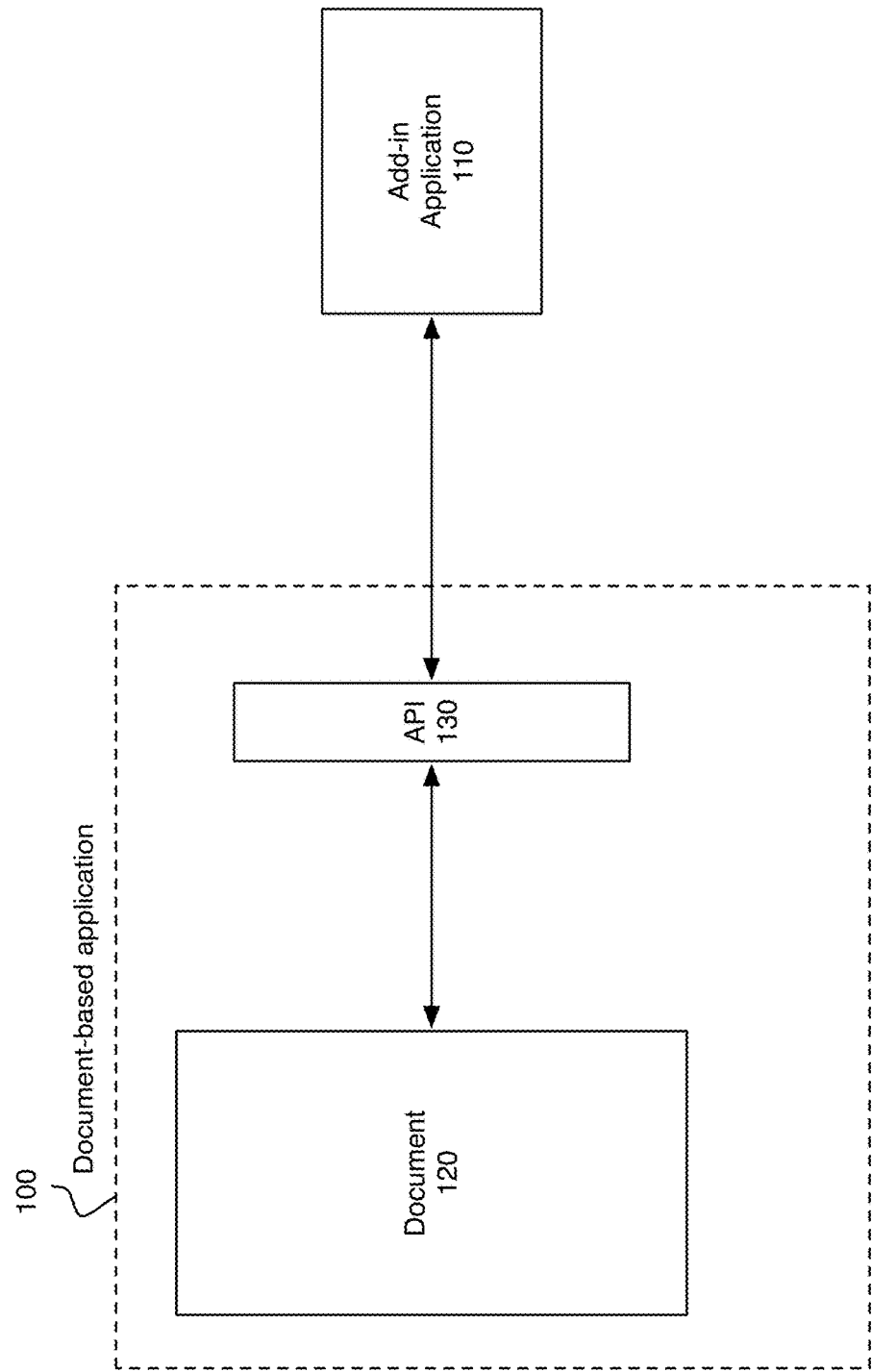

METHOD AND SYSTEM FOR PERSISTING ADD-IN DATA IN DOCUMENTS

CROSS-REFERENCE TO RELATED APPLICATIONS

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to data management and storage for software that provides additional functionality to document-based software.

Description of Related Art

There are many software applications designed for creating and editing text documents. Add-ins for these applications—which provide users additional functions and options for manipulating documents—frequently need to store data in documents created by such applications so that data can be stored during one editing session and retrieved in subsequent sessions. Examples of such data include: formatted text (i.e. text with font or paragraph attributes); non-formatted text (such as numbers or strings); images; sound files; binary data; or may consist of multiple data items, each of which needs to be associated with a specific location in the formatted text of the document.

In some situations, the applications' methods for storing this data in documents have serious drawbacks. For example, in Microsoft® Office Word, a standard method for storing data that can be used in multiple editing sessions involves inserting Word "fields" in the body of the document—either standard Word field types (such as TC and TOC fields for Table of Content entries and Table of Content fields) or custom fields which may be designated by an add-in for its own future use. Other data-storage methods are provided beginning with Microsoft® Word 2007, which involve the embedding of custom XML data within the body of the document.

There are numerous disadvantages to using fields or XML for this purpose. The act of inserting fields can be extremely slow and impede a user's ability to quickly update and store a document for later use. For instance, inserting a thousand fields in a document can often take a minute or more, and under certain circumstances, bugs found in the Word software can slow the insertion process down by an order of magnitude. Another problem is that if a field or XML is associated with a block of text immediately preceding or following the field or XML, and the block of text is moved, then the field or XML may be left behind in the original location and become disconnected from the associated text. A further problem is that if a field is used to store formatted text, and the user applies formatting to the surrounding text or paragraph, then the stored text may be inadvertently altered.

There are a number of document-based add-in applications (ranging from "metadata cleaners" to .PDF converters) that monitor the contents of a document while it is being edited, and sometimes alter the contents or the state of the Word application itself. If two such add-in applications are running simultaneously, they may conflict with each other as they modify document contents and cause performance problems; these problems may include dramatic slowdowns, alteration or corruption of document contents, or crashing of the Word application.

If an inexperienced user inadvertently turns on the display of field contents, then he or she may be confused by the display of normally hidden data. In addition, when the field codes are displayed, it is possible that the user could edit them by hand, which could result in loss of data or corruption of field contents.

Also, most data storage methods are proprietary to one or another specific document-based application, such that if an add-in depends too heavily on the particular methods provided, it may be impractical to create a version of the same add-in which works with different document-based application. For example, an add-in that works with Microsoft® Word may be difficult to port to WordPerfect®.

BRIEF SUMMARY OF THE INVENTION

The methods and systems of the present invention involve an add-in module for a document-based application. The present invention allows a document to store a wide variety of supplemental data without requiring auxiliary files. This provides the benefit that a document alone can be shared while still carrying the supplemental data. The document still works with its corresponding document-based application, even if a particular installation does not have the present invention installed. The document typically can be edited without accidentally modifying the supplemental data. The only additions to the visible content of the document itself are bookmarks.

The add-in includes at least two distinct sub-components: one or more rich item stores and a data store. The rich item stores allow for the in-memory storage and retrieval of identified items of data of types normally used in the document-based application (formatted text, spreadsheet cells, graphics, etc.) In particular, the rich item stores include a plurality of features for manipulating such data in memory, and for transferring such data to and from the document.

The data store saves and retrieves data (including data associated with the rich item store) to and from the designated storage areas in the document, in ways that have minimal or no effect on the body of that document. The data store encapsulates data access functions, and minimizes visibility of the data store implementation to the rest of the add-in.

The add-in also includes bookmark management functionality. The bookmark management maintains a mapping between marked locations in the document and data elements. The bookmark management also maintains information regarding particular reference locations within the document.

Each of these components will, in general, require a separate implementation for each document-based application; and each of them may be implemented in more than one way for any given document-based application.

Each embodiment of an add-in component will create and use at least one object of one of the claimed types; other embodiments might create multiple objects of the same or different claimed types. Some embodiments could also interact with multiple subject documents.

The present invention provides for persistence (storage) of add-in data in the document as a three-phase process. First, a rich item store component can serialize its own data structures into a block (or blocks) of string or binary data. That block (or blocks) of data is (are) passed to the add-in module. The add-in module can then serialize its own objects or data elements, including blocks of data from any rich item stores, into a further block of data, which may also be string or binary data. In some embodiments, the add-in module can serialize the data into a plurality of blocks of data, each of which has a key or identifier to allow it to be selectively retrieved. These serializations can be done using XML serialization, binary serialization or any other similar technique. Finally, the add-in module passes a block of data that it created to the data store. The data store then stores that block (or blocks) of data in the document.

The present invention also provides for retrieving add-in data from a document in a three-phase process. The add-in creates a data store object, and uses it to retrieve the previously-persisted, serialized data from the document. The add-in then de-serializes the retrieved data into objects and data elements, including any rich item store objects it might require. Once previously-serialized data has been loaded into a rich item store object, that data is again available to the add-in as a set of rich items which may be manipulated or transferred to the document or be otherwise used.

These components allow the present invention to provide a variety of additional functionality to a document-based application. For example, the add-in could be used to create a table of authorities in a word-processing application. The add-in would use known techniques to identify legal citations in the document. For example, Levit & James' Best Authority®, West Cite Advisor, Litéra CitationWare®, and Lexis® for Microsoft® Office are software applications that can identify legal citations in a document. Each citation (data) would be stored as a rich item, which includes the visually formatted text (which might be partially underlined or italicized, for example) and a bookmark to identify where in the document the citation appears.

The present invention has other applications as well. For example, it could be used to store supplementary formatted text or images linked to particular content of a document. Using the present invention, the formatted text or images could be efficiently stored as rich items within the document file structure.

This data storage involving rich items and a bookmark requires little modification of the visible content in a document. Generally, the only addition to the visible content is a bookmark, or other form of anchor, to identify a location within a document. This location might identify where stored content came from in the document. A bookmark has several useful properties as an anchor. It is a very lightweight object, which denotes a point or range of content within the host document. A bookmark continues to point to the same content area in the document, even if other content is added or deleted directly before it in the document; that is, it is anchored to the original content. A bookmark is identified by a unique name or id. Bookmarks are provided by most document-based applications and are well-known in the art. For example, Microsoft® Excel provides named ranges of cells; Corel® WordPerfect and Microsoft® Word provide bookmarks (by that name).

With respect to document content, a bookmark does not change the visual appearance of the final printed document. Some document-based applications, such as Microsoft® Word, allow a user to see a representation of bookmarks through the application's user interface. Regardless, a bookmark does not change the number of characters or range positions in the document.

When a bookmark is inserted, deleted, or modified, it does not require a document to be repaginated or formulas to be recalculated. In large documents, the repagination or recalculation operation can require substantial memory resources and is disfavored.

For example, in the case of Microsoft® Word, substantial performance gains are observed through the use of the present invention. The number and kind of interactions with the Word Object Model are reduced dramatically—for some add-ins, they can be reduced by two orders of magnitude, or more. This results in a dramatic improvement in the speed and reliability of add-in processing of information.

Some known add-in data storage methods might utilize the body of the formatted text of the document to store information. However, these methods would typically only modify a restricted part of the document, and would require only a small number of updates at the end of transaction or a session (as opposed to methods which store individual "fields" or "XML nodes" separately at each referenced location.) So, even using those storage methods with the present invention would offer very much the same benefits.

BRIEF DESCRIPTION OF THE SEVERAL VIEWS OF THE DRAWINGS

FIGS. 1A-1D show configurations of the present invention with respect to a document-based application.

DETAILED DESCRIPTION OF THE INVENTION

Figure 1C:
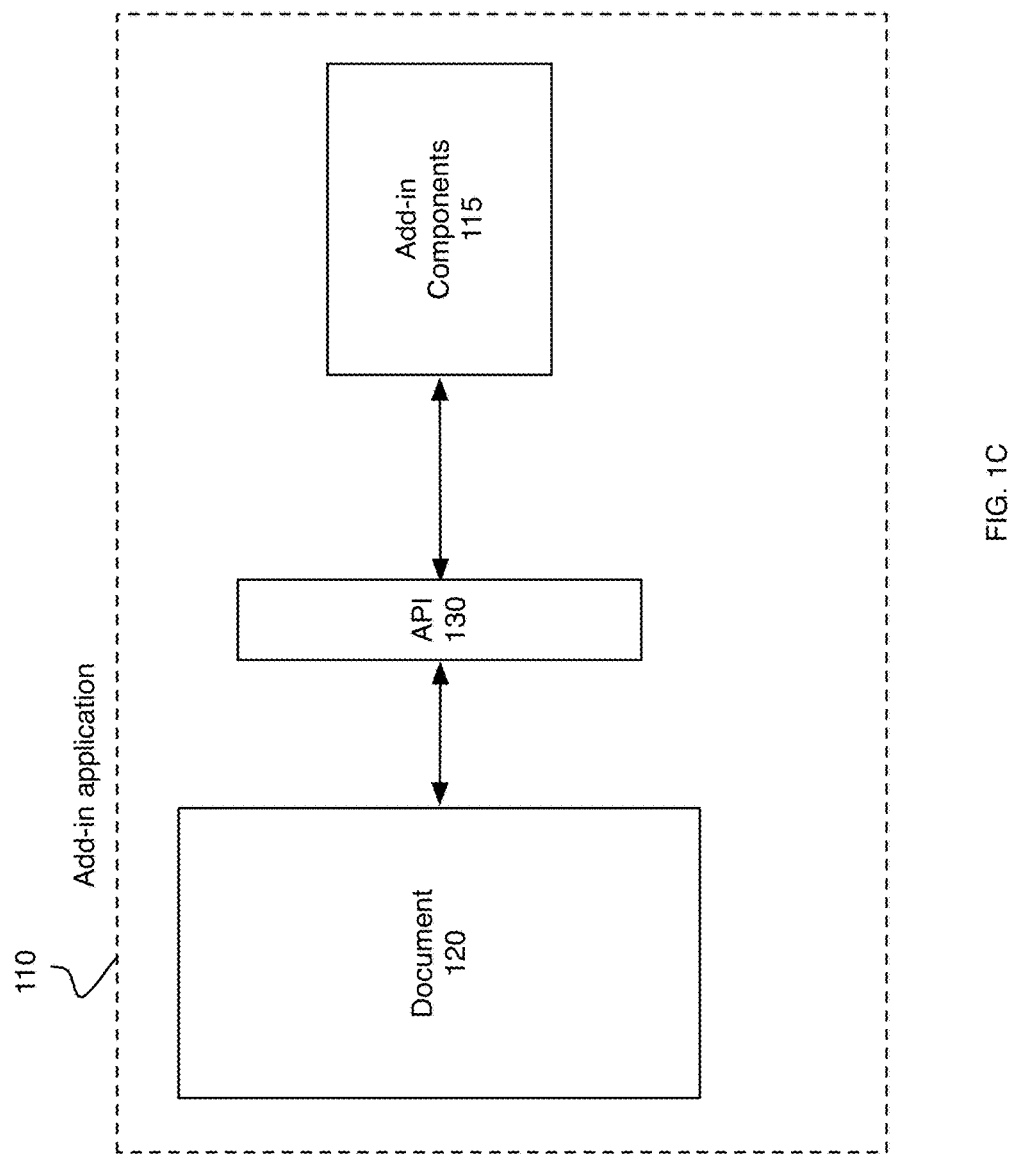

FIGS. 1A-1D show four different possible configurations of the present invention, although other configurations may be possible as well. As shown in FIG. 1A, add-in 110 runs as a child process or subroutine to document-based application 100. For example, add-in 110 may be launched from a toolbar within document-based application 100. Add-in process 110 accesses the contents of document 120 through calls to API 130. The add-in process 110 may use API 130 to access or control aspects of the user interface of document-based application 100, as well.

FIG. 1B shows a second possible configuration of the present invention. A document 120 is being edited within a document-based application 100. Add-in 110 runs as a standalone application in the operating system. It sends and receives messages to/from document-based application 100 through standard inter-process communications techniques. Document-based application 100 exposes an API 130 to allow for reading and modification of document 120. Add-in 110 accesses the contents of document 120 through calls to API 130. API 130 would typically be code provided by the manufacturer of document-based application 100, and would provide a convenient means for manipulating documents and possibly the application's user interface. In some embodiments, document-based application 100 is hidden from the user and runs completely under the control of add-in 110.

FIG. 1C shows a third possible configuration of the present invention. In this configuration, add-in 110 runs as a standalone application. Add-in components 115 access the contents of document 120 through calls to API 130, which functions as a subroutine in the process space of add-in 110, and may include part or all of the code of the document-based application, and which allows it to manipulate document 120.

Figure 1D:
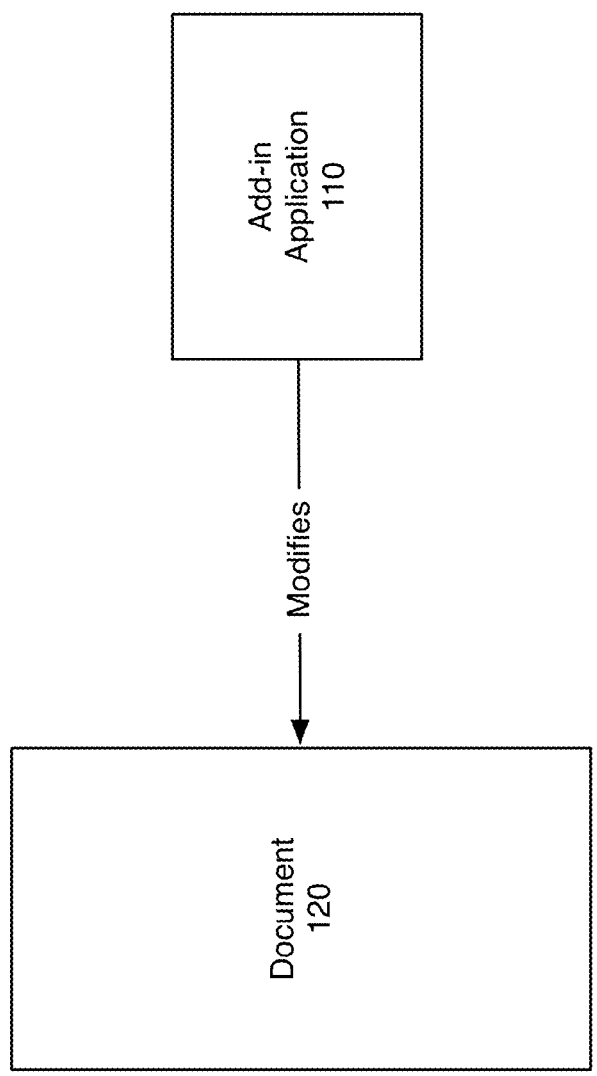

FIG. 1D shows a fourth possible configuration of the present invention. Add-in 110 runs as a standalone application. Add-in 110 accesses the contents document 120 directly through the file system. That is, add-in 110 reads and writes to the file that contains document 120. Add-in 110 may use an API (not shown) provided by the document-based application or may modify the contents of document 120 directly. For example, if document 120 is stored in XML, the add-in 110 may simply modify the XML directly.

Figure 2:
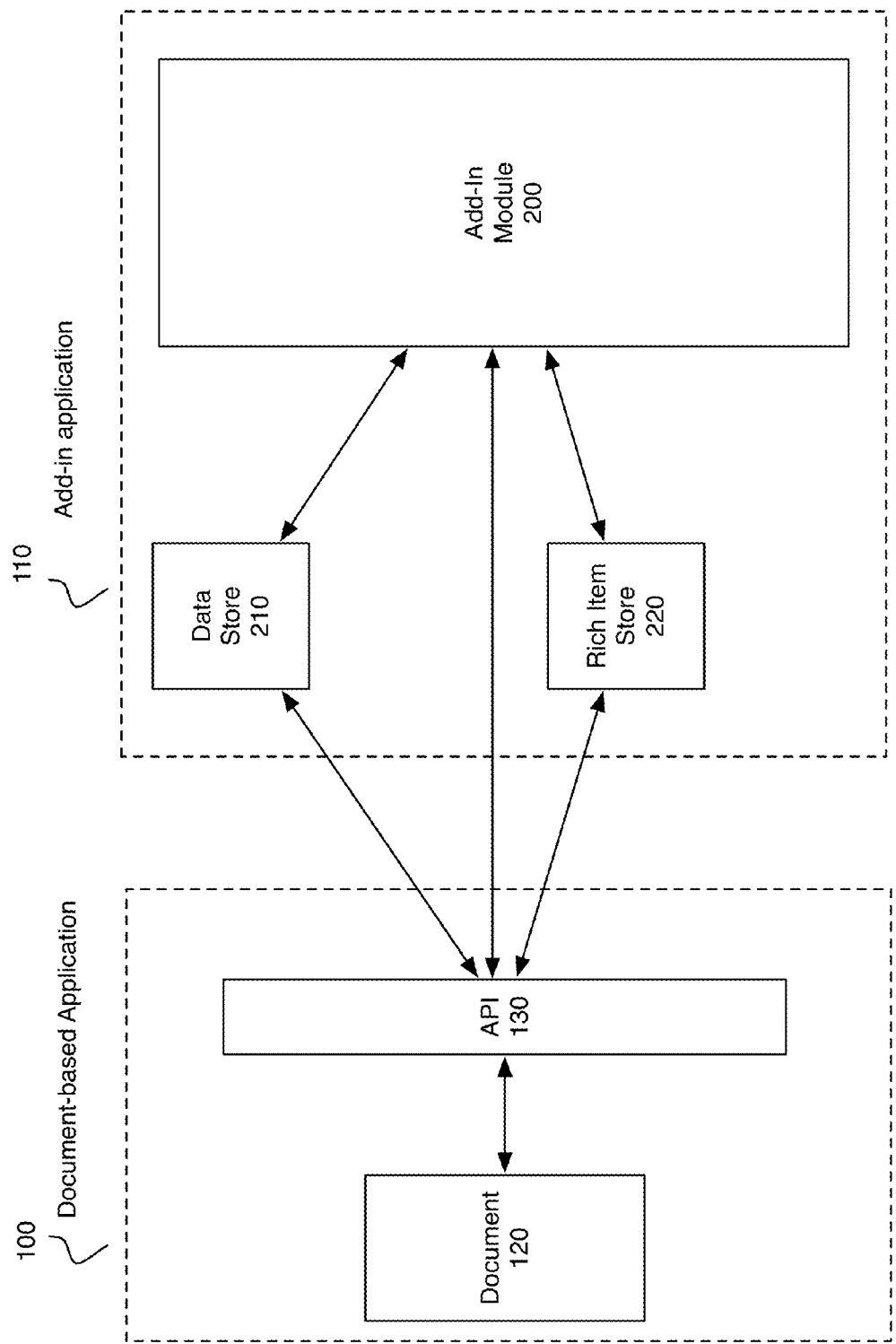
FIG. 2 illustrates an embodiment of the invention, illustrating major components.

FIG. 2 illustrates a typical configuration of components of the present invention. Add-in 110 comprises at least three modules: add-in module 200, data store 210, and one or more rich item stores 220. Add-in module 200 contains the primary logic for controlling add-in 110. Data store 210 provides persistence of data. Typically, data store 210 stores persistent data in document 120, although other locations are possible. Rich item store 220 provides storage for rich items, which may be formatted text, images, sound data, plain text, or other appropriate data. In FIG. 2, data and control flows are represented by arrows. The data flows are similar for other configurations of the present invention.

Typical data and control flows as indicated by arrows in FIG. 2 are shown by the following chart:

| Master Component | Slave Component | Control | Data |
|---|---|---|---|
| 100 | 200 | Launch add-in Notify add-in of events | |
| 200 | 210 | Create data store | Read data Write data |
| 200 | 220 | Create rich item store | Add/change/delete item Iterate items Request serialized data Send data to be deserialized |
| 200 | 130 | Open/Save/Close documents Automate 100 GUI Go to bookmark | Read from document content Modify document content Add/move/delete bookmark |
| 210 | 130 | | Read data from document Write data to document |
| 220 | 130 | | Copy rich content from document Write rich content to document |
| 130 | 100 | Automate various functions | |
| 130 | 120 | Modify document contents | |

Figure 3:
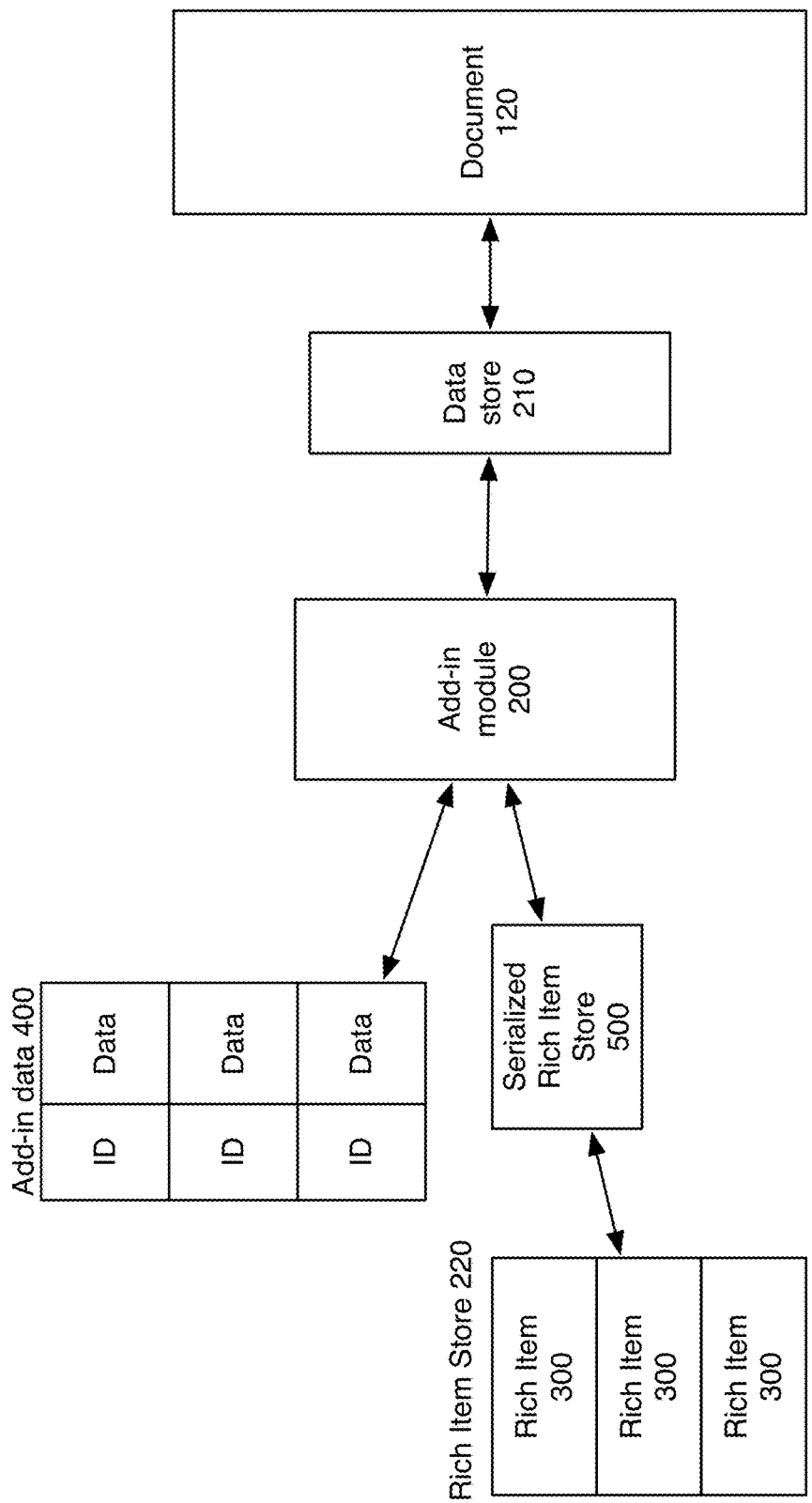
FIG. 3 illustrates an embodiment of the invention, showing components used for serializing and deserializing data.

FIG. 3 illustrates part of an embodiment of the present invention that enables data storage in a document. Data store 210 is able to persist substantial amounts of data in a document 120, so that such data may be restored in a subsequent session. In a typical embodiment, data store 210 is instantiated by add-in module 200. Data store 210 retrieves previously serialized data and passes it to add-in module 200. Data store 210 encapsulates the persistence process, so that the add-in module 200 can ignore the internal details.

As shown in FIG. 3, a rich item store 220 can serialize its own data structures into a block (or blocks) of string or binary data 500. That block (or blocks) of data 500 is (are) passed to the add-in module. Although not shown in FIG. 3, there may be multiple rich item stores 220. As explained in more detail below, each rich item store may contain a different data type, such as text, image, or sound, or rich item stores may contain data used for different purposes. In the embodiment shown in FIG. 3, the add-in module 200 has its own add-in data 400. For example, in an add-in for creating tables of authorities, the add-in data 400 could be a list of citations.

The add-in module 200 serializes the add-in data 400 together with the serialized rich item data 500 into a further block (or blocks) of data, which may also be string or binary data. These serializations can be done using XML serialization, binary serialization or any other similar technique. Finally, the add-in module passes the block (or blocks) of data that it created to the data store 210. The data store 210 then stores that block (or those blocks) of data in the document 120.

In some embodiments, the rich item stores 220 may be capable of writing (and reading) blocks of data directly to (from) the document 120 for storage (or retrieval).

To retrieve add-in data from a document, the process is reversed. The add-in module 200 creates a data store 210. The data store 210 retrieves the previously-persisted, serialized data from the document 120. In some embodiments, this retrieval may be done in one block of data. Some embodiments allow the add-in module 200 to read smaller blocks of data indexed by key. The add-in module 200 then de-serializes the retrieved data. As part of this process, it deserializes the add-in data 400. The add-in module 200 also instantiates any need rich item stores 220. It then passes serialized rich item data 500 to each rich item store 220. Each rich item store 220 deserializes that data and stores it in memory.

The data store 210 may use one or more of several alternative methods of storing data in document 120. Some document-based applications, such as Microsoft® Word, provide separate variable storage within a document. That is, they can declare variables in the variable namespace of document 120 and store data in the variables. The variables will automatically be stored with document 120. Another approach is to use document properties, also known as document-based meta-data. The data store 210 would create new custom properties and store data in those new properties, which are stored with document 120. An approach that is suitable for documents stored in an XML format, such as recent versions of Microsoft® Office, is to store data in custom tags within the document file. Although such tags will be parsed by an XML parser, making them accessible to data store 210, document-based application 100 will not make them visible to the user. Other approaches are also possible. For example, Microsoft® Windows operating systems provide compound documents (i.e., multiple sub-documents stored within one document) using technologies such as Object Linking and Embedding (OLE) storage.

In a typical embodiment, the data store 210 does not impose a limit on storage capacity. If necessary, for example if a variable has a maximum length, data store 210 can break up its data store into chunks in order to accommodate limitations of the document-based application 100. The data store 210 reassembles the chunks in the correct order using standard techniques when loading data from document 120.

In addition, the data store 210 may transform data formats as needed between one that is appropriate for use by add-in module 200 and one that is appropriate for storage in the document. Examples of such transformations are data compression; data encryption; conversion between binary format and 7-bit ASCII or other reduced-character-set formats; and replacement of character sequences which will not be accurately stored by the host application (such as escape sequences or repeated spaces) by alternative sequences which will be rendered accurately.

Rich item store 220 is capable of containing a set of items, which may be text, sound, images, or other rich data, each of which is associated with content in a particular region of the document 120. The types of the rich items depend on the particular embodiment and the features of document-based application 100. A textual rich item may be one of a variety of embodiments, including Hyper Text Markup Language (HTML), Extensible Markup Language (XML), Rich Text Format (RTF), comma-delimited values (CSV), Open Document Format, or other standard or proprietary representations as needed. Sound and images may be represented using any standard format known in the art.

Each rich item is indexed by a key, and the rich item store 220 provides a number of methods for accessing the items. The rich item store 220 can add or delete an item, or delete all items in the store. The rich item store 220 also allows searching for an item with a particular key value and iterating through all items in the collection. As described above, the rich item store 220 can also provide a serialized version of its entire store, which can then be stored in document 120 through data store 210. Standard serialization techniques can be used, and the serialized version may be in text or binary format. Similarly, rich item store 220 can initialize itself based on a previously serialized version.

In a typical embodiment, rich item store 220 provides methods which allow the add-in to copy rich content to and from specific rich items. The source or destination of the rich item may be either document 120, or another object supporting compatible formats. Such methods may use the Windows Clipboard or other standard techniques for transferring the rich item.

Figure 4:
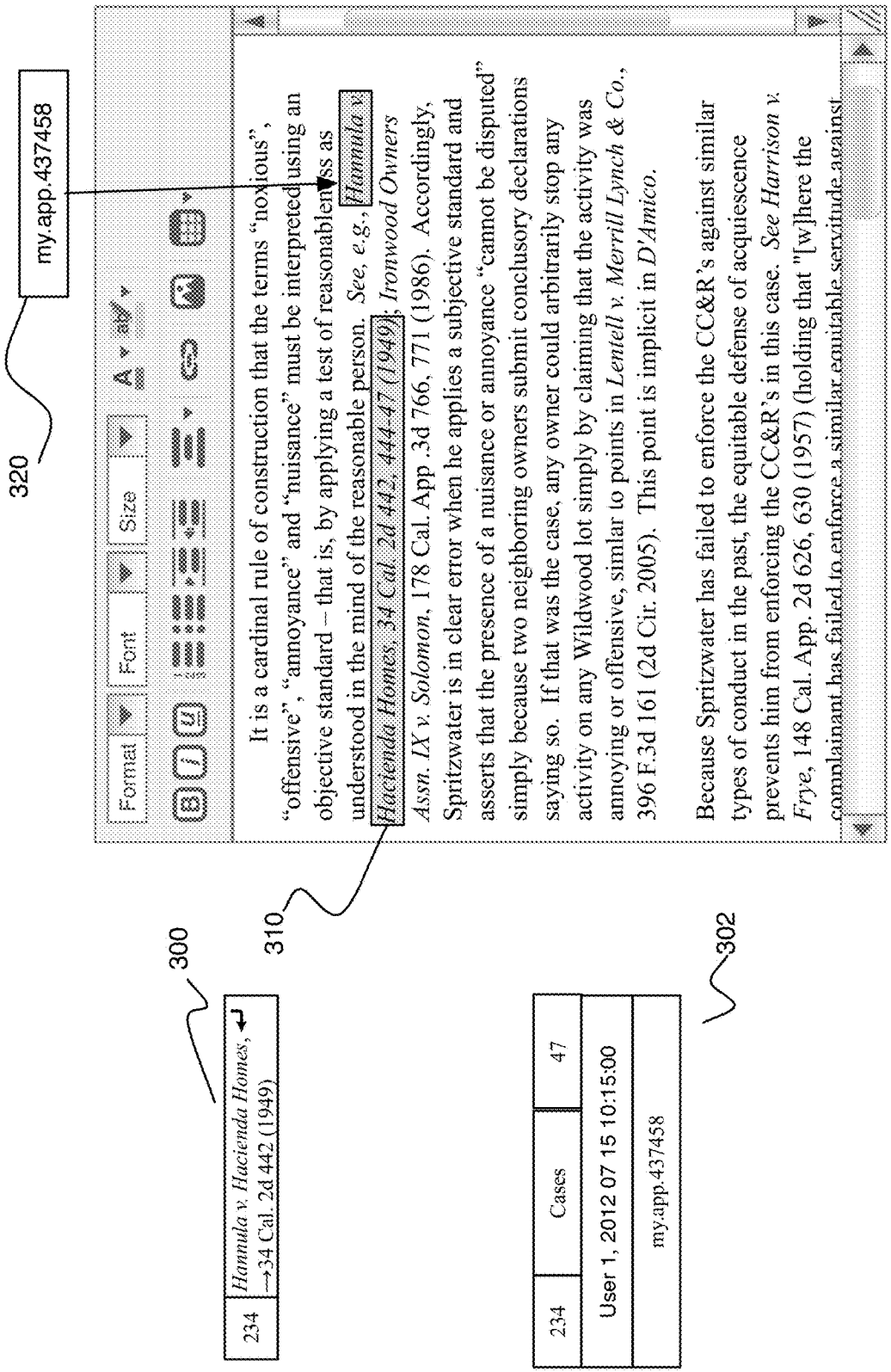
FIGS. 4-5 show an example application of the present invention, specifically creating a table of legal authorities.
Figure 5:
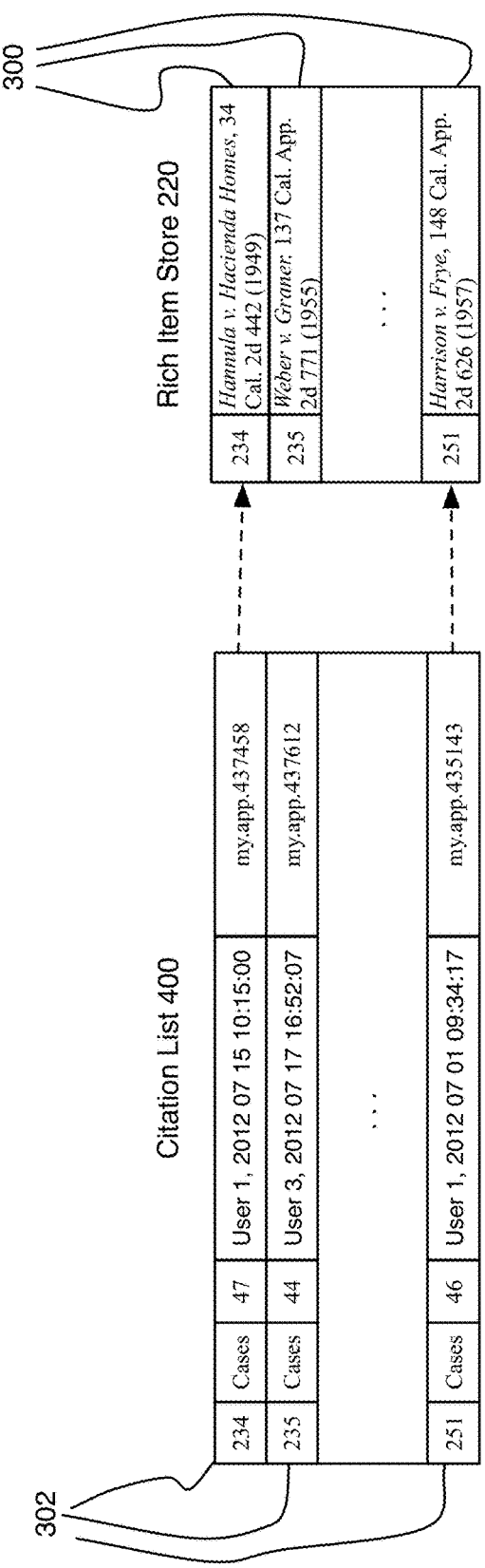

FIGS. 4-5 illustrate an example in an embodiment of the present invention that is used to create tables of legal authorities. In FIG. 4, highlighted text 310 represents a legal citation. Table of authorities entry 302, which is stored in add-in module 200, represents the table of authorities entry for the citation. Table of authorities entry 302 contains: a citation id (234 in the example); a field that identifies the user who last edited the rich item along with a timestamp of the last time the rich item was edited; a reference to a bookmark 320 (my.app.437458 in the example); and the length of the highlighted text 310 (47 in the example). Other fields are also possible, as would be understood by one of ordinary skill in the art.

A bookmark is a lightweight marker that does not appear in the visible content of the document. Bookmarks are typically identified by name. Because they have a number of uses, there are likely to be other bookmarks in a document in addition to the ones used by the add-in module 200. One possible technique to avoid naming collisions is to create a unique prefix for the add-in's bookmarks. The prefix identifies a bookmark as belonging to the add-in, and the rest of the bookmark name identifies the bookmark uniquely within the namespace of the add-in. The name of the bookmark may also contain information to identify its purpose.

There is another advantage to using bookmarks combined with ranges of content. By tracking the mouse cursor or text cursor, the add-in 110 can determine when such a cursor has entered a bookmarked range. Accordingly, the add-in 110 can perform interactive functions as highlighting the associated content, popping up information, or scrolling a separate view to show rich items corresponding to the associated content. Other functions are also possible, as would be understood by one of ordinary skill in the art.

FIG. 4 also shows one rich item 300. Rich item 300, which is stored in a rich item store 220, contains rich text for the table of authorities entry as it should appear in the table of authorities when produced (i.e., the pinpoint cite to pages 444-47 of the opinion in the example has been removed, and a line break and a tab have been added). Rich item 300 also contains the citation id (234), which allows the add-in to retrieve all of the data and rich text associated with the citation and to relate it to the location and range of the original citation in the document. There could also be additional rich items associated with the rich item store. For example, one additional rich item might include formatting of the text to present on the screen to the user, and another might contain a voice memo. Each type of rich item would be stored in a different rich item store dedicated to that type of rich item.

Other embodiments are also possible, as would be understood by one of ordinary skill in the art.

It is likely that text will be inserted before highlighted text 310 at some point as the document is edited. It is desirable to mark the location of highlighted text 310 in a relative way, that is, that continues to point to the same text even if the actual location of the text moves. In FIG. 4, this pointer is denoted as a bookmark 320. Bookmark 320 points to the location one character after the start of highlighted text 310. This technique makes it highly likely that if highlighted text 310 is moved or edited, the bookmark will stay with the text. In contrast, previously known techniques such as fields or embedding objects within the text cannot work this way. Placing such an object within a word would disrupt its integrity, potentially making spell-checkers or other text analysis tools unable to properly recognize the word.

This technique can be generalized to types of content other than text. In order to increase the probability that a bookmark will continue to point to the correct content, the bookmarked range may be chosen to start within the content, so that if it is moved, the bookmark will continue to point to the correct location within the document. This minimizes the possibility that an end user would move content from a region of a document to another location (or delete that text), but leave the associated bookmark behind.

Add-in module 200 may provide bookmark management functionality. The bookmark management function allows add-in module 200 to associate bookmarks or other placeholders in the document with elements of its own data structures.

In the simplest case, there will be a 1-1 correspondence between a subset of bookmarks in the document and a single collection of objects pertaining to the add-in. A simple lookup table indexed by the key value (e.g., a unique name or identifier) can be used to name and locate bookmarks in the document.

To meet a more complex requirement, an embodiment of the present invention might optionally provide a separate bookmark manager object whose primary purpose would be to manage this relationship.

FIG. 5 shows a citation list 400 stored by the add-in module 200 and a rich item store 220. Each table of authorities entry 302 has a citation id that corresponds to a citation id in the appropriate rich item 300. In this way, all of the data associated with particular content in the document 120, including one or more rich items 300 and a record 302 in the add-in module, are linked by a common key.

The described embodiments are not intended to be exhaustive descriptions of the present invention. Other variations are also possible, as would be understood by one of ordinary skill in the art.

The invention claimed is:

1. A system for adding functionality to a document-based application comprising a computer with a processor and non-transitory system memory storing executable instructions which, when executed by the processor, further comprise:
   a. an add-in module;
   b. at least one rich item store for storing rich items; and
   c. a data store for storing supplemental data elements created by the add-in module within a document created by the document-based application, where at least one supplemental data element is associated with a content segment in the document by a bookmark comprising a marked location of the content segment in the document, at least one rich item is associated with the at least one supplemental data element, the data store and the at least one rich item store are stored within the document as meta-data of the document, and each of the at least one rich item stores comprises rich items whose type is one of: text, image data, sound data, or binary data.

2. The system of claim 1, wherein the meta-data comprises document variables.

3. The system of claim 1, wherein the at least one rich item store serializes the rich items into at least one block of data.

4. The system of claim 1, wherein the at least one rich item store deserializes at least one block of data into rich items.

5. The system of claim 1, wherein the at least one rich item store also retrieves data.

6. The system of claim 1, wherein the data store retrieves data from the document.

7. The system of claim 1, wherein the add-in module stores a length of the content segment.

8. The system of claim 1, further comprising a bookmark management function.

9. The system of claim 1, wherein the data stored in the document by the data store is not visible to a user.

10. A method for retrieving data in a document created by a document-based application comprising:
    a. creating a data store object;
    b. retrieving serialized data from a document;
    c. an add-in module deserializing the serialized data, where the serialized data comprises serialized rich item data;
    d. deserializing the serialized rich item data; and
    e. loading deserialized data into at least one rich item store object, wherein the at least one rich item store object includes formatted text representing an entry in a table of authorities for a citation in the document.

11. A computer-implemented method for adding functionality to a document-based application comprising the steps of:
    a. creating a rich content item which is associated with a content segment in a document by a bookmark comprising a marked location of the content segment in the document, where the rich item is one of: text, image data, sound data, or binary data;
    b. storing the rich content item in a rich item store, where the rich item store is contained in first meta-data of the document; and
    c. storing the supplemental data element in a data store, where the data store is contained in second meta-data of the document.

12. The method of claim 11, wherein the meta-data comprises document variables.

13. The method of claim 11, further comprising the step of the at least one rich item store serializing the rich items into at least one block of data.

14. The method of claim 11, further comprising the step of the at least one rich item store deserializing at least one block of data into rich items.

15. The method of claim 11, further comprising the step of the at least one rich item store retrieving data.

16. The method of claim 11, further comprising the step of the data store retrieving data from the document.

17. The method of claim 11, further comprising the step of the add-in module storing a length of the content segment.

18. The method of claim 11, wherein the data stored in the document by the data store is not visible to a user.

* * * * *